(12) United States Patent
Katsurashima (10) Patent No.: US 6,785,792 B2
(45) Date of Patent: Aug. 31, 2004

(54) STORAGE SYSTEM AND DATA RELOCATION METHOD

(75) Inventor: Wataru Katsurashima, Tokyo (JP)

(73) Assignee: NEC Corporation, Tokyo (JP)

( * ) Notice: Subject to any disclaimer, the term of this patent is extended or adjusted under 35 U.S.C. 154(b) by 199 days.

(21) Appl. No.: 10/173,810

(22) Filed: Jun. 19, 2002

(65) Prior Publication Data

US 2003/0046491 A1 Mar. 6, 2003

(30) Foreign Application Priority Data

Jun. 22, 2001 (JP) ...................................... 2001/189292

(51) Int. Cl.[7] .............................................. G06F 13/20
(52) U.S. Cl. ...................................................... 711/165
(58) Field of Search ................................. 711/114, 165

(56) References Cited

U.S. PATENT DOCUMENTS 5,802,301 A * 9/1998 Dan et al. ................... 709/223
6,061,761 A 5/2000 Bachmat
6,694,405 B2 * 2/2004 Lam et al. ................... 711/112

FOREIGN PATENT DOCUMENTS

JP 2002-215007 A 8/2000

* cited by examiner

Primary Examiner—Kevin L. Ellis
(74) Attorney, Agent, or Firm—Sughrue Mion, PLLC (57) ABSTRACT

In a storage system, a plurality of logical disks are constituted by combining a plurality of physical disks. A logical disk management unit converts input/output (I/O) requests addressed to the logical disks into I/O requests addressed to corresponding physical disks, and outputs the converted I/O requests. A physical disk management unit accesses the corresponding physical disks in accordance with the I/O requests which are output from the logical disk management unit and addressed to the physical disks. A logical disk relocation control unit relocates the logical disks so as to set the busy rates of the physical disks within a range between the first state in which the ratio of the busy rates of the physical disks is equal to the ratio of the I/O processing performance values of the physical disks, and the second state in which the busy rates of the physical disks are leveled. A data relocation method is also disclosed.

28 Claims, 6 Drawing Sheets

STORAGE SYSTEM AND DATA RELOCATION METHOD

BACKGROUND OF THE INVENTION

The present invention relates to a storage system which constitutes a plurality of logical disks by combining a plurality of physical disks and, more particularly, to a storage system and data relocation method which increase the processing efficiency of each physical disk by relocating logical disks.

A general storage system is formed from a plurality of logical disks prepared by dividing data memory areas on a plurality of physical disks by an arbitrary unit and grouping the divided areas into an arbitrary number of sets. In the conventional storage system having this arrangement, if I/O (Input/Output) requests concentrate on a specific physical disk, a subsequent I/O request to the physical disk waits until the completion of the preceding I/O request, degrading the response. If this phenomenon occurs at part of the apparatus, this part bottlenecks the I/O processing performance of the overall apparatus.

A technique which solves this problem is disclosed in Japanese Patent Laid-Open No. 2000-215007 (reference 1). In a disk array apparatus disclosed in reference 1, the busy rate of a physical disk is measured, and if the measurement value exceeds a threshold designated by the user, a logical disk on the physical disk is selected. Data on the selected logical disk is transferred to another physical disk, and logical disk relocation of changing the correspondence between the logical disk and the physical disk is executed. As a result, concentration of I/O requests on some physical disks is canceled, and the I/O processing performance of the disk array apparatus is increased.

A similar technique is also disclosed in U.S. Pat. No. 6,061,761 (reference 2). In reference 2, the nonuniformity of the busy rate is minimized by exchanging logical disks. Logical disks to be exchanged are selected as follows. First, a list of pairs of exchangeable logical disks is created. Then, the variance of the busy rate of a physical disk after exchanging a pair of logical disks is calculated, and a pair of logical disks which provide a minimum variance is selected. This method can select a pair of exchangeable logical disks which minimize the nonuniformity of the busy rate. By repeating exchange, the busy rate of each physical disk is being leveled.

These techniques, however, may perform logical disk relocation leading to a decrease in I/O processing performance. The "decrease in I/O processing performance" means an increase in the average of I/O request processing standby times on physical disks. This problem occurs in a storage system constructed such that the I/O processing performance values of physical disks differ from each other. The problem will be explained in detail for the two prior arts.

The technique disclosed in reference 1 executes logical disk relocation when the busy rate of a physical disk exceeds a threshold designated by the user. Reference 1 does not describe a criterion for the user to set the threshold of the busy rate. In other words, the user must determine a criterion used for logical disk relocation.

If the I/O processing performance is equal between physical disks, the user can set a predetermined threshold. However, when a storage system having different I/O processing performance values of physical disks is constructed, the user must set a threshold in accordance with the I/O processing performance of each disk. The user must set a threshold based on his/her criterion of judgment. The user may perform logical disk relocation which decreases the I/O processing performance.

The technique disclosed in reference 2 uses a parameter "the variance of the busy rate of a physical disk" as the criterion of logical disk relocation. The variance of the busy rate of a physical disk after exchanging a pair of logical disks is calculated for each pair of exchangeable logical disks, and a pair of logical disks which minimize the variance is selected. This technique relocates logical disks so as to adjust the variance to "0", i.e., level the busy rate of each physical disk.

However, a state in which the busy rate is leveled may not coincide with a state in which the average of I/O request processing standby times on physical disks is minimized. As long as physical disks have the same I/O processing performance, the state in which the busy rate is leveled must coincide with the state in which the average of I/O request processing standby times on physical disks is minimized.

When a storage system having different I/O processing performance values of physical disks is constructed, the state in which the busy rate is leveled does not coincide with the state in which the average of I/O request processing standby times on physical disks is minimized. For this reason, the technique disclosed in reference 2 may induce the apparatus to an unpreferable state. That is, logical disk relocation which decreases the I/O processing performance may be done.

SUMMARY OF THE INVENTION

It is an object of the present invention to provide a storage system and data relocation method capable of appropriately performing logical disk relocation.

To achieve the above object, according to the present invention, there is provided a storage system comprising a plurality of logical disks constituted by combining a plurality of physical disks, logical disk management means for converting input/output (I/O) requests addressed to the logical disks into I/O requests addressed to corresponding physical disks, and outputting the converted I/O requests, physical disk management means for accessing the corresponding physical disks in accordance with the I/O requests which are output from the logical disk management means and addressed to the physical disks, and logical disk relocation control means for relocating the logical disks so as to set busy rates of the physical disks within a range between a first state in which a ratio of the busy rates of the physical disks is equal to a ratio of I/O processing performance values of the physical disks, and a second state in which the busy rates of the physical disks are leveled.

DESCRIPTION OF THE PREFERRED EMBODIMENTS

The principle of the present invention will be described. The present invention realizes logical disk relocation by two methods. First, each physical disk is assumed to be an M/M/1 queue model. The average of I/O request processing standby times on physical disks upon logical disk relocation is directly calculated, and a logical disk relocation plan which provides the minimum calculation value is adopted. Second, an optimal busy rate is set for each physical disk, and a logical disk relocation plan which adjusts the busy rate close to the optimal one is adopted. The first and second methods will be sequentially explained.

In the first method, each physical disk is assumed to be an M/M/1 queue model. The average of I/O request processing standby times on physical disks upon logical disk relocation is directly calculated, and a logical disk relocation plan which provides the minimum calculation value is employed.

Since the first method directly calculates the average of I/O request processing standby times on physical disks each serving as a parameter to be optimized, the possibility of logical disk relocation which decreases in I/O processing performance becomes low. In addition, prediction of an improvement of the processing standby time upon logical disk relocation uses the I/O processing performance value of the physical disk, which can increase the precision. The I/O processing performance value of the physical disk represents the number of I/O requests which can be completed within a unit time.

The first method is further divided into a case in which the average of I/O request processing standby times on physical disks is calculated using the I/O processing performance values, busy rates, and I/O request arrival rates of the physical disks, and a case in which the average is calculated using only the I/O processing performance values and I/O request arrival rates of the physical disks.

[First Embodiment]

Figure 1:
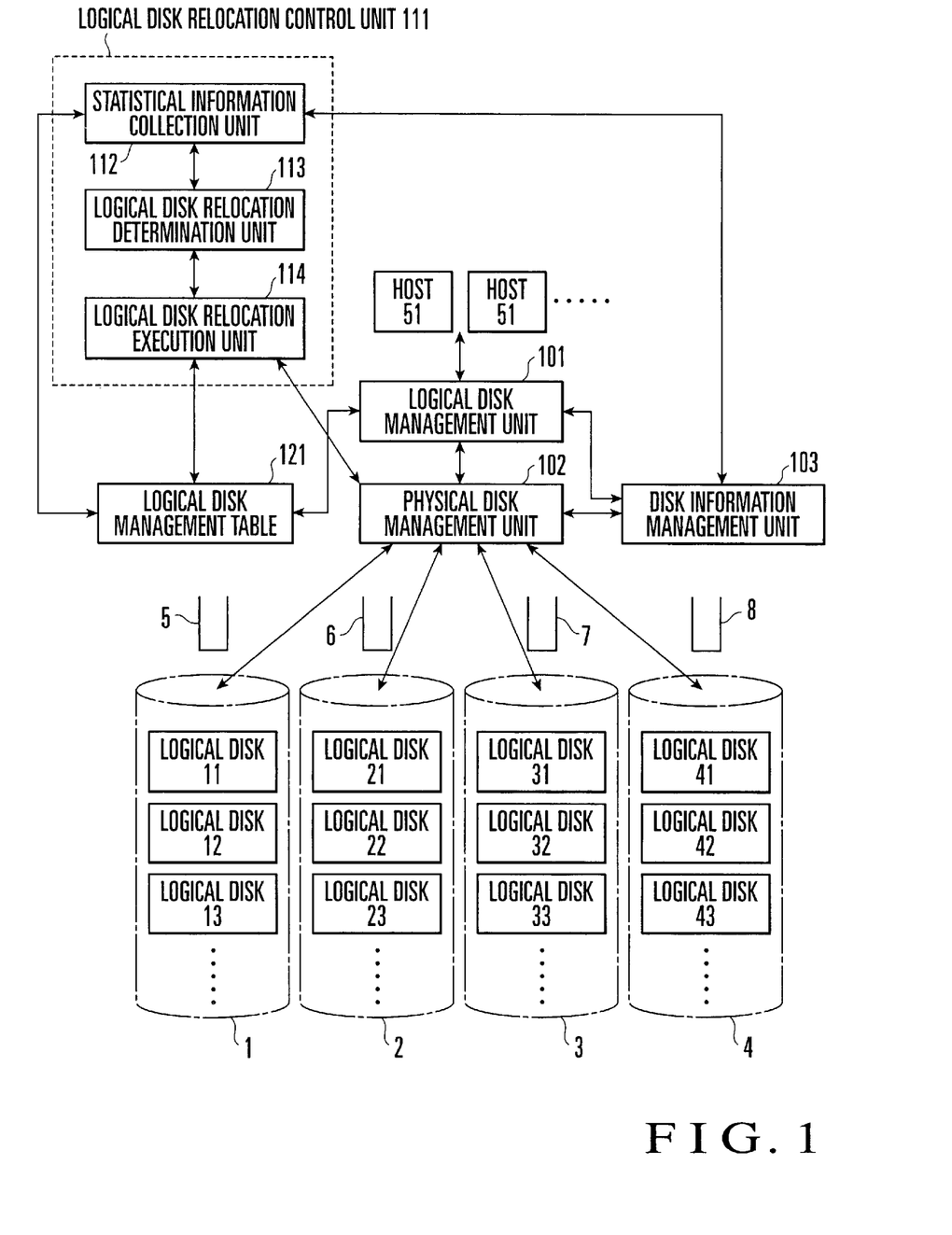
FIG. 1 is a block diagram showing a storage system according to the first embodiment of the present invention.

The first embodiment will describe a case in which the average of I/O request processing standby times on physical disks is calculated using the I/O processing performance values, busy rates, and I/O request arrival rates of the physical disks in the first method. FIG. 1 shows a storage system (disk array apparatus) according to the first embodiment of the present invention.

The storage system shown in FIG. 1 comprises a plurality of physical disks 1 to 4, a physical disk management unit 102 which manages the physical disks 1 to 4, a logical disk management unit 101 connected to the physical disk management unit 102, a disk information management unit 103 connected to the logical disk management unit 101 and physical disk management unit 102, a logical disk relocation control unit 111 connected to the disk information management unit 103, a logical disk management table 121 connected to the logical disk management unit 101 and logical disk relocation control unit 111, and host computers 51 and 52 connected to the logical disk management unit 101.

The physical disks 1 to 4 are made up of logical disks 11 to 13, 21 to 23, 31 to 33, and 41 to 43, respectively. The logical disk relocation control unit 111 is constituted by a statistical information collection unit 112 connected to the disk information management unit 103 and logical disk management table 121, a logical disk relocation determination unit 113 connected to the statistical information collection unit 112, and a logical disk relocation execution unit 114 connected to the physical disk management unit 102, logical disk relocation determination unit 113, and logical disk management table 121. Reference numerals 5 to 8 denote execution queues to the physical disks 1 to 4.

FIG. 1 shows only the four physical disks 1 to 4 for convenience, but many physical disks such as 100, 1,000, or 10,000 physical disks may exist. The logical disks 11 to 13, 21 to 23, 31 to 33, and 41 to 43 are obtained by dividing the physical disks 1 to 4 into logical data storage areas. Each logical disk is formed from the data memory area of one physical disk for convenience, but may be formed over a plurality of physical disks.

The execution queues 5 to 8 operate as FIFO (First-In First-Out) queues of the physical disks 1 to 4. When I/O processing in progress is completed, the execution queues 5 to 8 issue accumulated I/O requests to the physical disks 1 to 4. In the first embodiment, the execution queues 5 to 8 are FIFO queues for descriptive convenience, but the order of I/O requests may be changed within the queue.

The host computers 51 and 52 transmit I/O requests to the logical disk management unit 101. FIG. 1 shows only the two host computers for convenience, but many host computers such as 10, 100, or 1,000 host computers may exist.

These units schematically operate as follows. The logical disk management unit 101 receives I/O requests addressed to the logical disks 11 to 13, 21 to 23, 31 to 33, and 41 to 43 from the host computers 51 and 52. Then, the logical disk management unit 101 converts logical disk numbers (numbers which designate requested logical disks) into corresponding physical disk numbers by looking up the logical disk management table 121, and sends the I/O requests to the physical disk management unit 102. The logical disk management unit 101 observes the access counts of the logical disks 11 to 13, 21 to 23, 31 to 33, and 41 to 43, I/O sizes (data lengths), and the like, and sends the observation results to the disk information management unit 103.

Examples of the logical disk management unit 101 are a director in the disk array, an agent in the disk array, volume management software of the host computer, and a symmetric or asymmetric volume management server. FIG. 1 shows only one logical disk management unit 101 for convenience, but the logical disk management unit 101 is actually constituted by a plurality of logical disk management units.

The physical disk management unit 102 receives I/O requests addressed to the physical disks 1 to 4 from the logical disk management unit 101, and issues I/O requests to the requested physical disks 1 to 4. At this time, if I/O processing is in progress on destination physical disks, the issued I/O requests are temporarily stored in the execution queues 5 to 8. The physical disk management unit 102 observes the access counts of the physical disks 1 to 4, the sizes of I/O requests, the availability, and the like, and sends the observation results to the disk information management unit 103.

Examples of the physical disk management unit 102 are a hardware RAID (Redundant Arrays of Inexpensive Disks) control board or a software RAID program in the disk array, and a hardware RAID control board or software RAID control program in the host computer. FIG. 1 shows only one physical disk management unit 102 for convenience, but the physical disk management unit 102 is actually constituted by a plurality of physical disk management units.

The disk information management unit 103 summarizes and holds pieces of information sent from the logical disk management unit 101 and physical disk management unit 102 at a time interval preset by the user. Upon the lapse of the time interval preset by the user, the disk information management unit 103 discards the held information.

The disk information management unit 103 is provided as a hardware or software function of the disk array, a RAID control board, or a RAID control program. FIG. 1 shows only one disk information management unit 103 for convenience, but the disk information management unit 103 is actually constituted by a plurality of disk information management units.

The statistical information collection unit 112 of the logical disk relocation control unit 111 accesses the disk information management unit 103 at time preset by the user, and acquires pieces of information about the logical disks 11 to 13, 21 to 23, 31 to 33, and 41 to 43 and the physical disks 1 to 4. At the same time, the statistical information collection unit 112 also acquires information of the logical disk management table 121. The pieces of information acquired are arranged and accumulated.

The logical disk relocation determination unit 113 creates a list of logical disk relocation plans on the basis of information stored in the statistical information collection unit 112, and calculates evaluation functions for the respective relocation plans. This evaluation function represents the average of processing standby times obtained by averaging the standby times of physical disks until processing corresponding to an I/O request starts. The evaluation function is calculated from the busy rates of the physical disks 1 to 4, the access counts, and the I/O processing performance values of the physical disks. The logical disk relocation determination unit 113 transmits a relocation plan which exhibits the maximum improvement of the evaluation function as an optimal relocation plan to the logical disk relocation execution unit 114.

The logical disk relocation execution unit 114 relocates target logical disks to destination physical disks on the basis of the relocation plan transmitted from the logical disk relocation determination unit 113.

Examples of the logical disk relocation control unit 111 constituted by the statistical information collection unit 112, logical disk relocation determination unit 113, and logical disk relocation execution unit 114 are a server program running on a network such as a local area network or fiber channel, a management program running on a host computer, a client peer-to-peer-connected to the disk array, an agent in the disk array, and their combinations.

The operation of the above-described storage system will be described in detail with reference to the flow charts of FIGS. 2 to 7.

Figure 2:
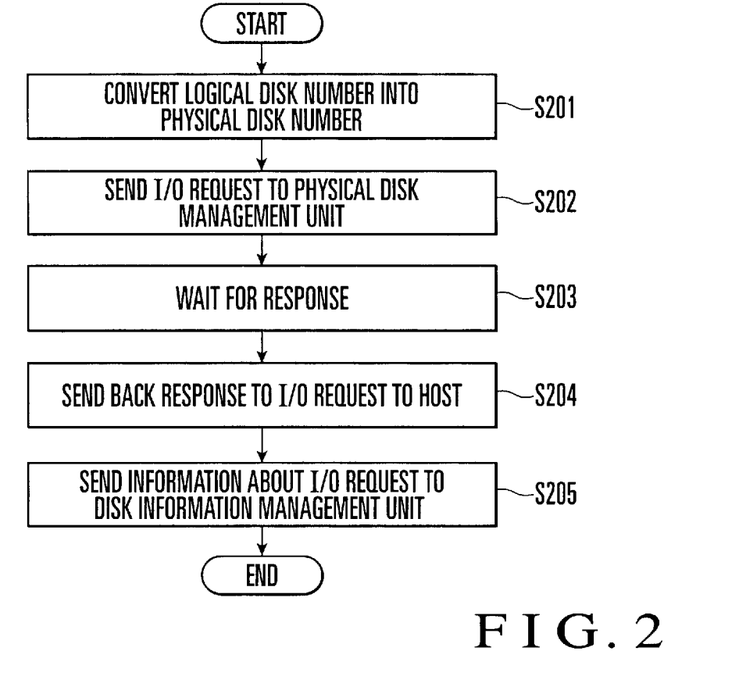
FIG. 2 is a flow chart for explaining the operation of a logical disk management unit shown in FIG. 1.

As shown in FIG. 2, the logical disk management unit 101 receives an I/O request from the host computer 51 or 52. Then, the logical disk management unit 101 converts a logical disk number sent together with the I/O request into a corresponding physical disk number by looking up the logical disk management table 121 (step S201).

Subsequently, the logical disk management unit 101 sends an I/O request addressed to a physical disk corresponding to the converted physical disk number to the physical disk management unit 102 (step S202). After issuing the I/O request, the logical disk management unit 101 waits for a response to the I/O request from the physical disk management unit 102 (step S203).

After receiving the response to the I/O request from the physical disk management unit 102, the logical disk management unit 101 sends back the response to the I/O request to the host computer 51 or 52 serving as a request source (step S204). The logical disk management unit 101 sends information about the current I/O request to the disk information management unit 103 (step S205).

Figure 3:
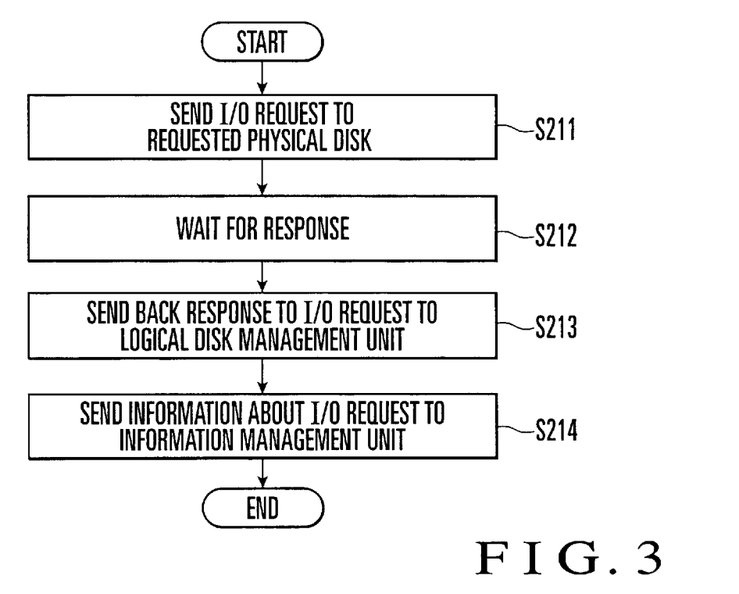
FIG. 3 is a flow chart for explaining the operation of a physical disk management unit shown in FIG. 1.

As shown in FIG. 3, the physical disk management unit 102 is invoked by I/O requests addressed to the physical disks 1 to 4 from the logical disk management unit 101. After receiving the I/O requests to the physical disks 1 to 4, the physical disk management unit 102 transmits the I/O requests to the requested physical disks 1 to 4 designated by physical disk numbers sent together with the I/O requests (step S211).

At this time, if I/O processing is in progress on the requested physical disks 1 to 4, the issued I/O requests are temporarily stored in the execution queues 5 to 8 corresponding to the requested physical disks 1 to 4. After issuing I/O requests, the physical disk management unit 102 waits until the requested I/O processing is completed (step S212). Upon the completion of the requested I/O processing, the physical disk management unit 102 sends back responses to the I/O requests to the logical disk management unit 101 (step S213). After sending back the responses to the I/O requests, the physical disk management unit 102 transmits information about the current I/O requests to the disk information management unit 103 (step S214).

Figure 4:
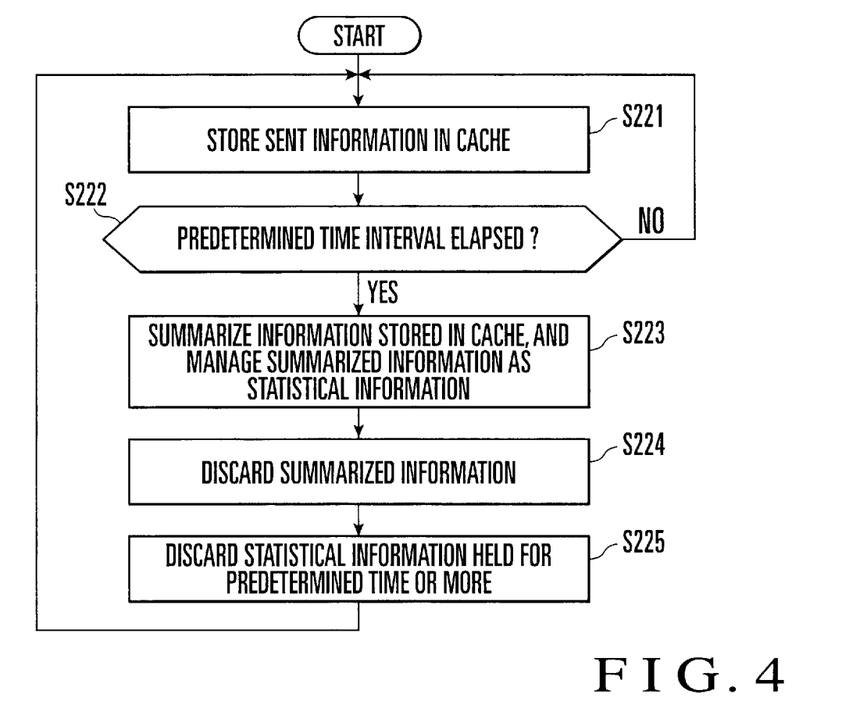
FIG. 4 is a flow chart for explaining the operation of a disk information management unit shown in FIG. 1.

As shown in FIG. 4, the disk information management unit 103 stores pieces of information sent from the logical disk management unit 101 and physical disk management unit 102 in a cache (step S221). The disk information management unit 103 checks whether a time interval preset by the user has elapsed (step S222). If YES in step S222, the disk information management unit 103 summarizes pieces of information stored in the cache and manages them as statistical information (step S223).

The disk information management unit 103 discards the summarized information stored in the cache (step S224). Then, the disk information management unit 103 discards the statistical information held for a predetermined time or more (step S225), and returns to step S221.

The statistical information managed by the disk information management unit 103 includes the busy rate, the I/O request arrival rate, the occupied busy rate of each logical disk belonging to one physical disk, and the occupied arrival rate of each logical disk belonging to the physical disk. These pieces of statistical information are managed for the physical disks 1 to 4.

The busy rate (utilization factor) is a value calculated by dividing the utilization time (including a seek time) of a physical disk used in accordance with an I/O request by a total time. The I/O request arrival rate of a physical disk represents the number of I/O requests per unit time received by each physical disk from the physical disk management unit 102.

The occupied busy rate of a logical disk is a value calculated by dividing the busy rate of a physical disk into those of logical disks belonging to the physical disk. That is, if the busy rates occupies by logical disks belonging to the same physical disk are arranged on the same column in a matrix, the sum on the column is the busy rate of the physical disk. Similar to the busy rate of the physical disk, the occupied busy rate of the logical disk is obtained by processing information acquired by the disk information management unit 103.

The occupied arrival rate of a logical disk is a value calculated by dividing the I/O request arrival rate of a physical disk into those of logical disks belonging to the physical disk. If the arrival rates occupies by logical disks belonging to the same physical disk are arranged on the same column in a matrix, the sum on the column is the I/O request arrival rate of the physical disk. Similar to the I/O request arrival rate of the physical disk, the occupied I/O request arrival rate of the logical disk is obtained by processing information acquired by the disk information management unit 103.

Figure 5:
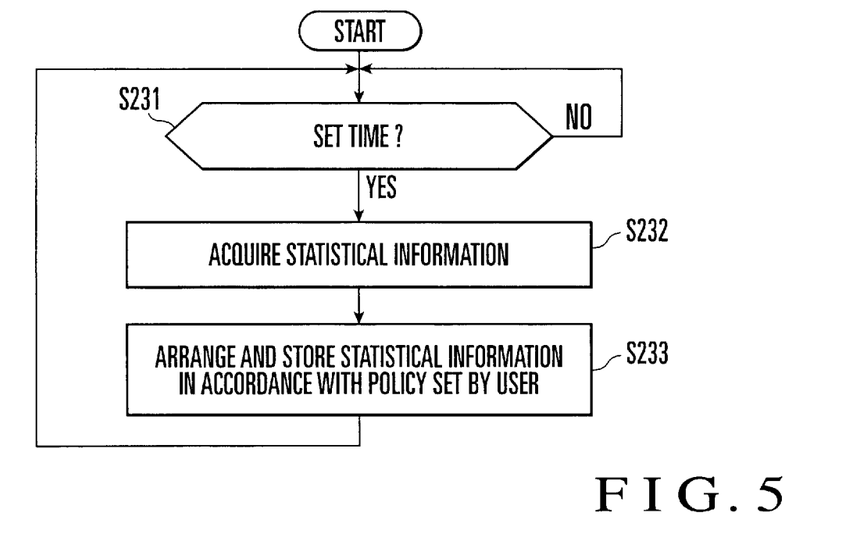
FIG. 5 is a flow chart for explaining the operation of a statistical information collection unit shown in FIG. 1.

As shown in FIG. 5, the statistical information collection unit 112 waits for time preset by the user (step S231). At the preset time, the statistical information collection unit 112 accesses the disk information management unit 103 to acquire pieces of statistical information for each logical disk and each physical disk (step S232). Further, the statistical information collection unit 112 acquires information of the logical disk management table 121.

The statistical information collection unit 112 arranges and accumulates the acquired statistical information and the like in accordance with an arrangement policy preset by the user (step S233), and returns to step S231. Examples of the arrangement policy are:
1) to further summarize pieces of statistical information for each logical disk and each physical disk every time unit;
2) When the structure of a physical disk or logical disk is changed, to reflect the change of the structure on accumulated statistical information; and
3) to discard statistical information upon the lapse of a predetermined time or more.

Figure 6:
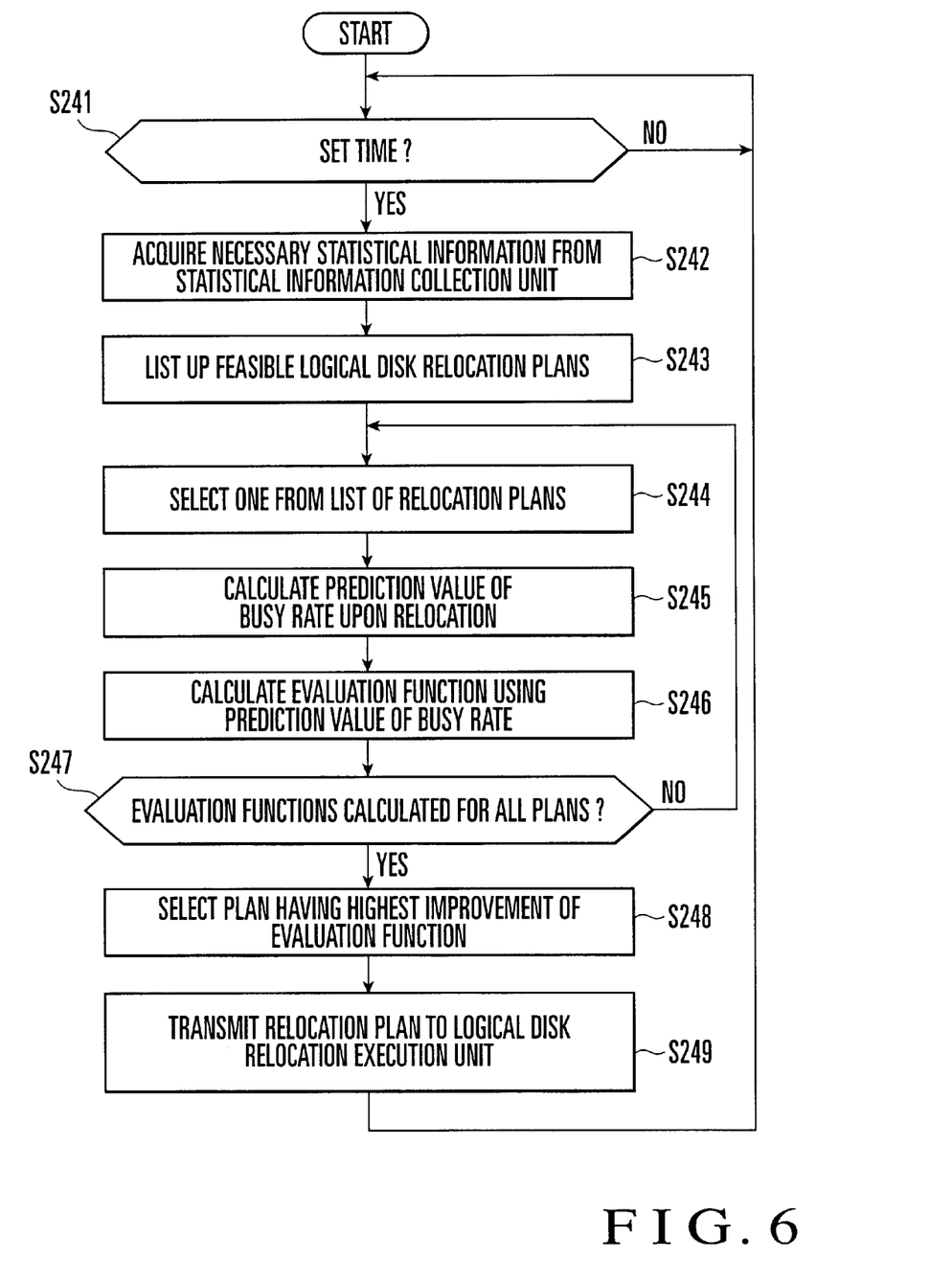
FIG. 6 is a flow chart for explaining the operation of a logical disk relocation determination unit shown in FIG. 1.

As shown in FIG. 6, the logical disk relocation determination unit 113 waits for time preset by the user (step S241). At the preset time, the logical disk relocation determination unit 113 accesses the statistical information collection unit 112 to acquire necessary statistical information (step S242).

At this time, the logical disk relocation determination unit 113 acquires not all the statistical information held by the statistical information collection unit 112, but only necessary statistical information in accordance with an acquisition policy preset by the user. Examples of the acquisition policy are:
1) to acquire only the latest statistical information within a predetermined period;
2) to acquire pieces of statistical information in a plurality of periods; and
3) to acquire only past statistical information within a predetermined period.

Pieces of statistical information are summarized again, and the summarized statistical information is used to determine relocation. The logical disk relocation determination unit 113 performs processing using the summarized statistical information.

The logical disk relocation determination unit 113 lists up feasible logical disk relocation plans (step S243). Which relocation plans are listed up changes depending on the logical disk relocation method. An example of the logical disk relocation method is to form logical disks with the same size, define some of them as free logical disks, set all logical disks except the free logical disks as source logical disk candidates, and change destination logical disks as free logical disks.

All the conceivable combinations of source logical disk candidates and destination logical disk candidates based on the above relocation method are listed up as relocation plans. Note that when a destination logical disk and source logical disk are formed on the same physical disk, relocation cannot increase the access efficiency of the physical disk. Such a combination is, therefore, removed from a list of relocation plans.

As another example of the relocation method, free logical disks are not particularly designated. In this case, all the logical disks serve as source logical disk candidates or destination logical disk candidates. Since data are recorded on both source and destination logical disks, exchanging these logical disks requires an intermediate buffer or the like. In practice, logical disks can be exchanged using a free logical disk of the same size as a buffer.

In addition to the two relocation methods, many other methods can be adopted. For example, when logical disks have various sizes, a combination of source and destination logical disk candidates having the same size is listed up.

The logical disk relocation determination unit 113 selects one relocation plan whose evaluation function (to be described later) has not been calculated from the list of relocation plans (step S244). The logical disk relocation determination unit 113 calculates the prediction value of a busy rate obtained when a logical disk is relocated in accordance with the selected relocation plan (step S245). The prediction value of the busy rate is calculated as follows. First, the logical disk relocation determination unit 113 sets, as the prediction value of the busy rate of a source physical disk, a value obtained by subtracting the occupied busy rate of a target logical disk from the busy rate of the source physical disk.

Then, the logical disk relocation determination unit 113 sets, as the prediction value of the busy rate of a destination physical disk, a value obtained by adding the occupied busy rate of the target logical disk x (the I/O processing performance value of the source physical disk/the I/O processing performance value of the destination physical disk) to the busy rate of the destination physical disk. The I/O processing performance values of the source and destination physical disks are dynamically measured values or values set by the user.

The logical disk relocation determination unit 113 calculates an evaluation function Wt of the selected relocation plan by using the prediction value of the busy rate (step S246):

$$Wt = \frac{1}{c} \cdot \sum_{i=1}^{n} \frac{\rho_i^2}{1-\rho_i} \left( \text{where } \sum_{i=1}^{n} \lambda_i = c \right) \quad (1)$$

Equation (1) assumes that each physical disk i (=1, 2, ..., n; n is the number of physical disks) is an M/M/1 queue model. Equation (1) represents the average of I/O request processing standby times for an I/O request arrival rate α and busy rate $\rho_i$ of each physical disk i. The I/O request arrival rate $\lambda_i$ and busy rate $\rho_i$ are obtained by processing information sampled by the disk information management unit 103. Of the busy rates $\rho_i$, the busy rates of the source and destination physical disks of the logical disk are prediction values calculated in step S245.

The logical disk relocation determination unit 113 checks whether the evaluation functions Wt have been calculated for all the relocation plans (step S247). If NO in step S247, the logical disk relocation determination unit 113 returns to step S244. For each of the listed relocation plans, the logical disk relocation determination unit 113 repeats the processes in steps S244 to S246.

After calculating the evaluation functions Wt for all the relocation plans, the logical disk relocation determination unit 113 selects a relocation plan having the highest improvement of the evaluation function Wt from the list of relocation plans (step S248). The improvement is higher as the value of the evaluation function Wt is lower. The logical disk relocation determination unit 113 notifies the logical disk relocation execution unit 114 of the relocation plan with the highest improvement of the evaluation function Wt selected in step S248 (step S249).

Figure 7:
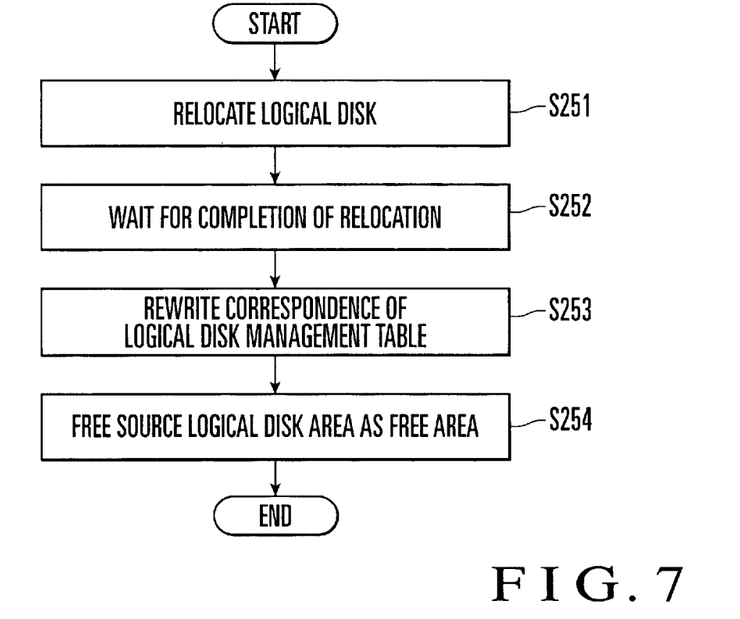
FIG. 7 is a flow chart for explaining the operation of a logical disk relocation execution unit shown in FIG. 1.

As shown in FIG. 7, the logical disk relocation execution unit 114 starts relocation of the logical disk in accordance with the relocation plan with the highest improvement selected by the logical disk relocation determination unit 113 (step S251).

The logical disk relocation execution unit 114 waits for the completion of logical disk relocation (step S252), and rewrites the source logical disk number recorded on the logical disk management table 121 to the destination logical disk number upon the completion of relocation (step S253). Finally, the logical disk relocation execution unit 114 frees the source logical disk area as a free area (step S254).

The first embodiment decreases the possibility of logical disk relocation which results in low I/O processing performance. The first reason is that the average of I/O request processing standby times on physical disks which is a parameter to be optimized is directly calculated. The second reason is that the prediction precision increases by using the I/O processing performance value of a physical disk when an improvement of the processing standby time by relocating a logical disk is predicted.

[Second Embodiment]

Figure 8:
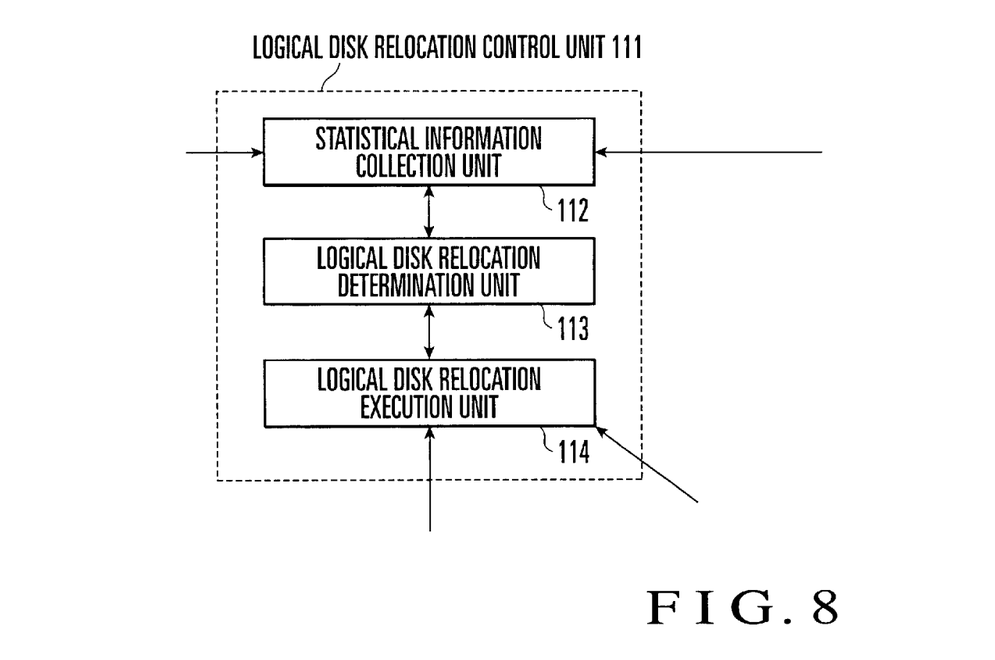
FIG. 8 is a block diagram showing a logical disk relocation control unit according to the second (to eighth) embodiment(s) of the present invention.

The second embodiment of the present invention will be described in detail with reference to FIG. 8. This embodiment calculates the average of I/O request processing standby times on physical disks by using only the I/O processing performance values and I/O request arrival rates of the physical disks in the first method described above. The second embodiment is different from the first embodiment in the operation of a logical disk relocation determination unit 113'. The arrangement of a storage system except FIG. 8 is the same as that in the first embodiment, and the second embodiment will be explained with reference to FIG. 1.

Figure 9:
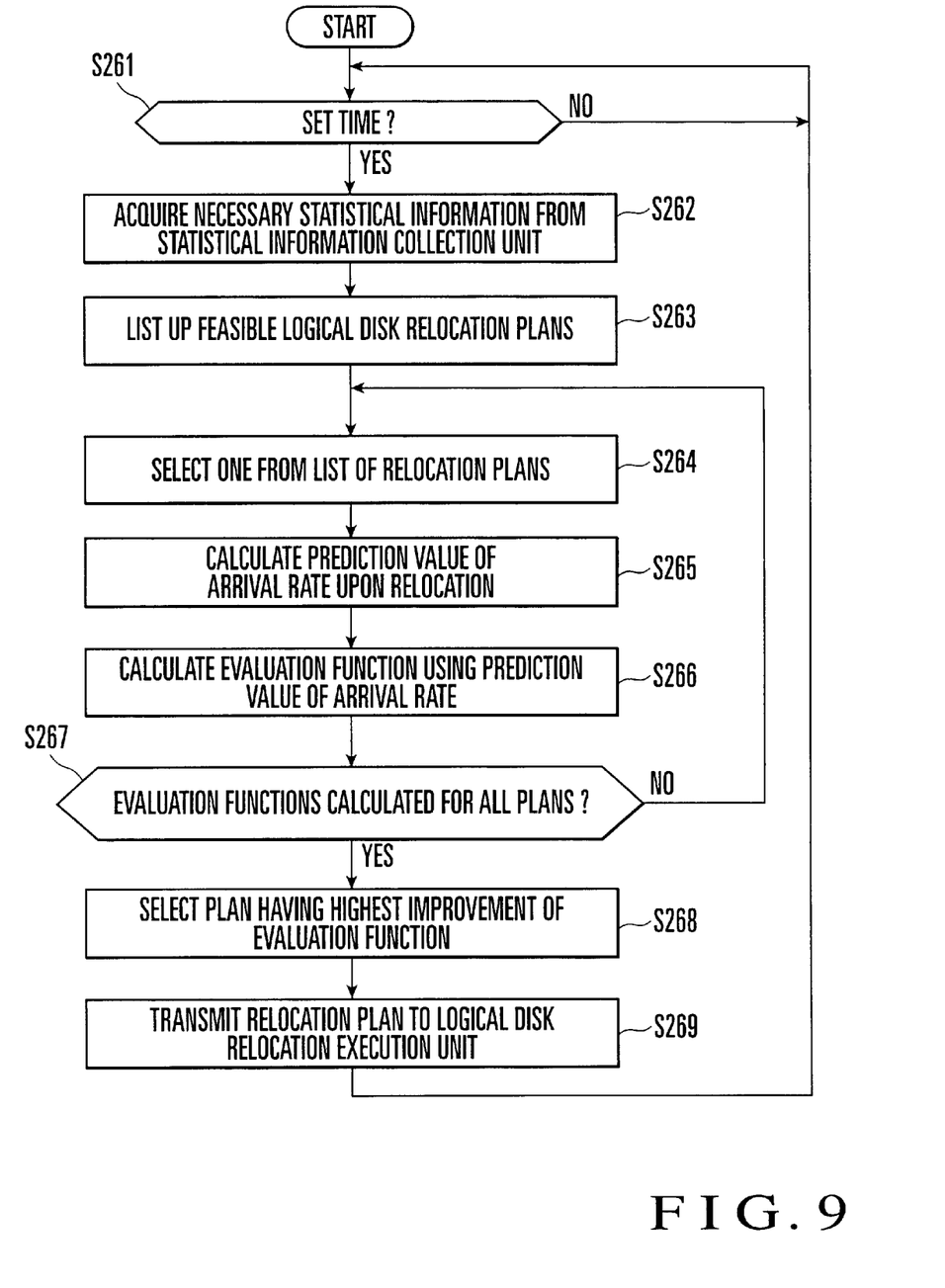
FIG. 9 is a flow chart for explaining the operation of a logical disk relocation determination unit shown in FIG. 8.

As shown in FIG. 9, the logical disk relocation determination unit 113' waits until time preset by the user (step S261). At the preset time, the logical disk relocation determination unit 113' accesses a statistical information collection unit 112 to acquire necessary statistical information (step S262).

At this time, the logical disk relocation determination unit 113' acquires not all the statistical information held by a statistical information collection unit 112, but only necessary statistical information in accordance with an acquisition policy preset by the user. Similar to step S243, the logical disk relocation determination unit 113' lists up feasible logical disk relocation plans (step S263).

The logical disk relocation determination unit 113' selects one relocation plan whose evaluation function has not been calculated from the list of relocation plans (step S264). The logical disk relocation determination unit 113' calculates the prediction value of an I/O request arrival rate obtained when a logical disk is relocated in accordance with the selected relocation plan (step S265).

The prediction value of the I/O request arrival rate is calculated as follows. First, the logical disk relocation determination unit 113' sets, as the prediction value of the I/O request arrival rate of a source physical disk, a value obtained by subtracting the occupied arrival rate of a target logical disk from the I/O request arrival rate of the source physical disk.

Then, the logical disk relocation determination unit 113' sets, as the prediction value of the I/O request arrival rate of a destination physical disk, a value obtained by adding the occupied arrival rate of the target logical disk x (the I/O processing performance value of the source physical disk/the I/O processing performance value of the destination physical disk) to the I/O request arrival rate of the destination physical disk.

The logical disk relocation determination unit 113' calculates the evaluation function Wt of the selected relocation plan by using the prediction value of the I/O request arrival rate (step S266):

$$Wt = \frac{1}{c} \cdot \sum_{i=1}^{n} \frac{\lambda_i^2}{\mu_i(\mu_i - \lambda_i)} \left( \text{where } \sum_{i=1}^{n} \lambda_i = c \right) \quad (2)$$

Equation (2) assumes that each physical disk i (=1, 2, ..., n; n is the number of physical disks) is an M/M/1 queue model. Equation (2) represents the average of the I/O request processing standby times on a physical disk i for an I/O request arrival rate $\lambda_i$ and I/O processing performance value $\mu_i$ of each physical disk i.

The I/O request arrival rate $\lambda_i$ is obtained by processing information sampled by a disk information management unit 103. The I/O processing performance value $\mu_i$ is a dynamically measured value or value set by the user. Of the I/O request arrival rates $\lambda_i$, the I/O request arrival rates of the source and destination physical disks of the logical disk are prediction values calculated in step S265.

The logical disk relocation determination unit 113' checks whether the evaluation functions Wt have been calculated for all the relocation plans (step S267). If NO in step S267, the logical disk relocation determination unit 113' returns to step S264. For each of the listed relocation plans, the logical disk relocation determination unit 113' repeats the processes in steps S264 to S266.

After calculating the evaluation functions Wt for all the relocation plans, the logical disk relocation determination unit 113' selects a relocation plan having the highest improvement of the evaluation function Wt from the list of relocation plans (step S268). The improvement is higher as the value of the evaluation function Wt is lower. The logical disk relocation determination unit 113' notifies a logical disk relocation execution unit 114 of the relocation plan selected in step S268 (step S269).

In addition to the effects of the first embodiment, the second embodiment need not measure or estimate the busy rates of physical disks 1 to 4. The present invention can be applied to a situation in which the information amount is small.

[Third Embodiment]

The third embodiment of the present invention will be described in detail. The third embodiment realizes logical disk relocation by the above-described second method of setting an optimal busy rate for each physical disk and adopting a relocation plan which adjusts the busy rate close to the optimal busy rate. An optimal state, i.e., a state in which the average of I/O request processing standby times on physical disks is minimized will be explained. After that, details of the method will be explained.

The optimal state falls within the range of the first state in which the ratio of the busy rates of physical disks is equal to the ratio of their I/O processing performance values, and the second state in which the busy rates of the physical disks are leveled, the reason of which will be described later. A state which is optimal within this range changes depending on the busyness of each physical disk. The I/O processing performance value of the physical disk represents the number of I/O requests which can be completed per unit time. The I/O request is a random seek, and its data length is a general size.

The reason why setting the busy rate within the above-mentioned range is effective is that the busy rate is optimally leveled when many I/O requests are transmitted from host computers 51 and 52 to the storage system, i.e., when the busy rates of all the physical disks are almost "1". In addition, the ratio of the busy rates of physical disks is adjusted equal to the ratio of their I/O processing performance values when a few I/O requests are transmitted to the storage system, i.e., when the busy rates of all the physical disks are almost "0". Hence, the state of the storage system exists between the first and second states.

As the busy rate comes close to "1", the relationship between the busy rate and the I/O request processing standby time on the physical disk exhibits a steep slope, and the I/O request processing standby time abruptly increases. Leveling the busy rates is optimal when the busy rates of all the physical disks are almost "1", because as is apparent from the relationship between the busy rate and the processing standby time, the influence of the difference in busy rate between physical disks is larger than that of the influence in I/O processing performance value.

The reason why it is optimal to adjust the ratio of the busy rates of physical disks equal to the ratio of their I/O processing performance values when the busy rates of all the physical disks are almost "0" can be derived as follows. It can be estimated that "a state in which the average of I/O request processing standby times on physical disks becomes minimum coincides with a state in which the I/O request processing standby times of the physical disks are leveled". Assuming that each physical disk is an M/M/1 queue model derives equation (3). From equation (3), the ratio of the busy rates is optimally equal to the ratio of the I/O processing performance values.

$$\frac{\rho_i}{\mu_i(1-\rho_i)} = \frac{\rho_k}{\mu_k(1-\rho_k)} \quad (3)$$

where $\rho_i$ is the busy rate of an arbitrary physical disk 1, and $\rho_k$ is the busy rate of an arbitrary physical disk k. For $\rho_1$, $\rho_k \to 0$, $\rho_1 \cdot \rho_k \to 0$, and thus $\rho_1/\rho_k = \mu_1/\mu_k$. By performing logical disk relocation which induces the busy rate of each physical disk to the range of the optimal state, logical disk relocation which decreases the I/O processing performance can be avoided. The third embodiment will be described in detail.

Also in this embodiment, the arrangement of the storage system is the same as that in the first embodiment, and the storage system will be explained using the same reference numerals as in FIG. 1. The third embodiment is different from the first embodiment in the operation of a logical disk relocation determination unit 113' (FIG. 8). The order of processes is the same as that in the first embodiment, and will be described with reference to the flow chart of FIG. 6.

As shown in FIG. 6, the logical disk relocation determination unit 113' waits until time preset by the user (step S241). At the preset time, the logical disk relocation determination unit 113 accesses a statistical information collection unit 112 to acquire necessary statistical information (step S242).

At this time, the logical disk relocation determination unit 113' acquires not all the statistical information held by the statistical information collection unit 112, but only necessary statistical information in accordance with an acquisition policy preset by the user. The logical disk relocation determination unit 113' lists up feasible logical disk relocation plans (step S243).

The logical disk relocation determination unit 113' selects one relocation plan whose evaluation function has not been calculated from the list of relocation plans (step S244). The logical disk relocation determination unit 113' calculates the prediction value of a busy rate obtained when a logical disk is relocated in accordance with the selected relocation plan (step S245).

The prediction value of the busy rate is calculated as follows. First, the logical disk relocation determination unit 113' sets, as the prediction value of the busy rate of a source physical disk, a value obtained by subtracting the occupied busy rate of a target logical disk from the busy rate of the source physical disk.

Then, the logical disk relocation determination unit 113' sets, as the prediction value of the busy rate of a destination physical disk, a value obtained by adding the occupied busy rate of the target logical disk x (the I/O processing performance value of the source physical disk/the I/O processing performance value of the destination physical disk) to the busy rate of the destination physical disk. The I/O processing performance values of the source and destination physical disks are dynamically measured values or values set by the user.

The logical disk relocation determination unit 113' calculates the evaluation function Wt of the selected relocation plan by using the prediction value of the busy rate (step S246). The evaluation function Wt in the third embodiment provides a value calculated by squaring the deviation between an optimal busy rate and a busy rate for each physical disk, and adding the squares of the deviations of physical disks. Of the busy rates, the busy rates of the source and destination physical disks of the logical disk are prediction values calculated in step S245. A smaller value of the evaluation function Wt represents that the improvement is higher and the busy rate comes close to an optimal state.

A method of setting an optimal busy rate will be explained. As described above, when the busy rates of all the physical disks are almost "1", leveling the busy rates is optimal. When the busy rates of all the physical disks are almost "0", it is optimal to adjust the ratio of the busy rates of physical disks equal to the ratio of their I/O processing performance values. From this, busy rates in the first and second states are calculated, and a linearly interpolated value based on the calculated values is defined as the optimal busy rate of the physical disk.

Which of linearly interpolated values is used is determined by the average of the busy rates of physical disks. For example, when the average of the busy rates of the physical disks is "0.5", an intermediate value between the busy rates in the first and second states is an optimal busy rate. This calculation of the optimal busy rate is executed for each physical disk. Note that linear interpolation is adopted in the third embodiment, but quadratic or cubic interpolation may be adopted.

The logical disk relocation determination unit 113' checks whether the evaluation functions Wt have been calculated for all the relocation plans (step S247). If NO in step S247, the logical disk relocation determination unit 113' returns to step S244. For each of the listed relocation plans, the logical disk relocation determination unit 113' repeats the processes in steps S244 to S246.

After calculating the evaluation functions Wt for all the relocation plans, the logical disk relocation determination unit 113' selects a relocation plan having the highest improvement of the evaluation function Wt from the list of relocation plans (step S248). The improvement is higher as the value of the evaluation function Wt is lower. The logical disk relocation determination unit 113' notifies a logical disk relocation execution unit 114 of the relocation plan with the highest improvement of the evaluation function Wt selected in step S248 (step S249).

The third embodiment does not employ the assumption that each physical disk is an M/M/1 queue model. Even if the physical disks 1 to 4 receive I/O requests whose occurrence rate is greatly different from the Poisson distribution, the possibility of logical disk relocation which decreases the I/O processing performance becomes low.

[Fourth Embodiment]

The fourth embodiment of the present invention will be described in detail. The fourth embodiment realizes logical disk relocation by the third method of setting an optimal I/O request arrival rate for each physical disk and adjusting the I/O request arrival rate of each physical disk close to the optimal I/O request arrival rate, in place of the second method of setting an optimal busy rate for each physical disk and adjusting the busy rate close to the optimal busy rate.

The first state in which the ratio of the busy rates of physical disks is made to coincide with the ratio of their I/O processing performance values corresponds to the third state in which the ratio of the I/O request arrival rates of physical disks is made to coincide with the square ratio of their I/O processing performance values. The second state in which the busy rates of physical disks are leveled corresponds to the fourth state in which the ratio of the I/O request arrival rates of the physical disks is made to coincide with the ratio of their I/O processing performance values. The fourth embodiment will be described in detail.

Also in this embodiment, the arrangement of the storage system is the same as that in the first embodiment, and the storage system will be explained using the same reference numerals as in FIG. 1. The fourth embodiment is different from the first embodiment in the operation of a logical disk relocation determination unit 113' (FIG. 8). The order of processes is the same as that in the second embodiment, and will be described with reference to the flow chart of FIG. 9.

As shown in FIG. 9, the logical disk relocation determination unit 113' waits until time preset by the user (step S261). At the preset time, the logical disk relocation determination unit 113' accesses a statistical information collection unit 112 to acquire necessary statistical information (step S262).

At this time, the logical disk relocation determination unit 113' acquires not all the statistical information held by a statistical information collection unit 112, but only necessary statistical information in accordance with an acquisition policy preset by the user. Similar to step S243, the logical disk relocation determination unit 113' lists up feasible logical disk relocation plans (step S263).

The logical disk relocation determination unit 113' selects one relocation plan whose evaluation function has not been calculated from the list of relocation plans (step S264). The logical disk relocation determination unit 113' calculates the prediction value of an I/O request arrival rate obtained when a logical disk is relocated in accordance with the selected relocation plan (step S265).

The prediction value of the I/O request arrival rate is calculated as follows. First, the logical disk relocation determination unit 113' sets, as the prediction value of the I/O request arrival rate of a source physical disk, a value obtained by subtracting the occupied arrival rate of a target logical disk from the I/O request arrival rate of the source physical disk.

Then, the logical disk relocation determination unit 113' sets, as the prediction value of the I/O request arrival rate of a destination physical disk, a value obtained by adding the occupied arrival rate of the target logical disk x (the I/O processing performance value of the source physical disk/the I/O processing performance value of the destination physical disk) to the I/O request arrival rate of the destination physical disk.

The logical disk relocation determination unit 113' calculates the evaluation function Wt of the selected relocation plan by using the prediction value of the I/O request arrival rate (step S266). The evaluation function Wt in the fourth embodiment provides a value calculated by squaring the deviation between an optimal I/O request arrival rate and an I/O request arrival rate for each physical disk, and adding the squares of the deviations of physical disks. Of the I/O request arrival rates, the I/O request arrival rates of the source and destination physical disks of the logical disk are prediction values calculated in step S265. A smaller value of the evaluation function Wt represents that the improvement is higher and the I/O request arrival rate comes close to an optimal state.

A method of setting an optimal I/O request arrival rate will be explained. When the busy rates of all the physical disks are almost "1", it is optimal to make the ratio of the I/O request arrival rates of physical disks coincide with the ratio of their I/O processing performance values. When the busy rates of all the physical disks are almost "0", it is optimal to make the ratio of the I/O request arrival rates of physical disks coincide with the square ratio of their I/O processing performance values. Hence, I/O request arrival rates in the third and fourth states are calculated, and a linearly interpolated value based on the calculated values is defined as the optimal busy rate of the physical disk.

Which of linearly interpolated values is used is determined by the average of the I/O request arrival rates of physical disks. For example, when the average of the I/O request arrival rates of physical disks is "0.5", an intermediate value between the I/O request arrival rates in the third and fourth states is an optimal I/O request arrival rate. This calculation of the optimal I/O request arrival rate is executed for each physical disk. Note that linear interpolation is adopted in the fourth embodiment, but quadratic or cubic interpolation may be adopted.

The logical disk relocation determination unit 113' checks whether the evaluation functions Wt have been calculated for all the relocation plans (step S267). If NO in step S267, the logical disk relocation determination unit 113' returns to step S264. For each of the listed relocation plans, the logical disk relocation determination unit 113' repeats the processes in steps S264 to S266.

After calculating the evaluation functions Wt for all the relocation plans, the logical disk relocation determination unit 113' selects a relocation plan having the highest improvement of the evaluation function Wt from the list of relocation plans (step S268). The improvement is higher as the value of the evaluation function Wt is lower. The logical disk relocation determination unit 113' notifies a logical disk relocation execution unit 114 of the relocation plan selected in step S268 (step S269).

In addition to the effects of the third embodiment, the fourth embodiment need not measure or estimate the busy rates of physical disks 1 to 4. The present invention can be applied to a situation in which the information amount is small.

[Fifth Embodiment]

The fifth embodiment of the present invention will be described in detail. In the fifth embodiment of the present invention, the physical disks 1 to 4 of the first embodiment are replaced by physical disk groups which constitute RAID (Redundant Arrays of Inexpensive Disks). In this case, pieces of information about the busy rate, the I/O request arrival rate, the I/O processing performance value, the occupied busy rate of each logical disk, and the occupied arrival rate of each logical disk are managed not for each physical disk but for each physical disk group which constitutes RAID.

In addition to the effects of the first embodiment, the amount of information sampled suffices to be small and can be easily managed in the fifth embodiment.

[Sixth Embodiment]

The sixth embodiment of the present invention will be described in detail. The sixth embodiment changes the evaluation function described in the first embodiment to the following evaluation function Wt:

$$Wt = \frac{1}{d} \cdot \sum_{j=1}^{m} \sum_{i=1}^{n} \frac{\rho_{ij}^2}{1 - \rho_{ij}} \left( \text{where} \sum_{j=1}^{m} \sum_{i=1}^{n} \lambda_{ji} = d \right) \quad (4)$$

where n is the number of physical disks 1 to 4, m is the unit number of pieces of statistical information acquired by a logical disk relocation determination unit 113' from a statistical information collection unit 112 when the size managed by a disk information management unit 103 is defined as one unit, $\rho_{ij}$ is the busy rate of a physical disk i (=1, 2, ..., n) obtained from the unit number j (=1, 2, ..., m) of pieces of statistical information, and $\lambda_{ij}$ is the I/O request arrival rate of a physical disk obtained from the unit number j of pieces of statistical information.

Equation (4) is different from equation (1) used in the first embodiment in that the logical disk relocation determination unit 113' uses statistical information for calculation of the evaluation function Wt without summarizing the information. In the sixth embodiment, data of statistical information at small time intervals managed by the disk information management unit 103 are directly used to calculate the evaluation function Wt.

For example, when the disk information management unit 103 manages data at an interval of about 1 h and the logical disk relocation determination unit 113' uses these data, 24 pieces of statistical information at an interval of 1 h are extracted and used to calculate the evaluation function Wt without summarizing them.

The time interval by which the disk information management unit 103 manages data may be as short as about 10 min or as long as about 1 day. Alternatively, the disk information management unit 103 may manage data at a plurality of time intervals such as 10 min and 1 h. The logical disk relocation determination unit 113' extracts and uses an arbitrary number of pieces of statistical information. In other words, the logical disk relocation determination unit 1131 generates a period as a relocation criterion by combining short periods by which pieces of statistical information are managed.

Similar to equation (1), equation (4) represents the prediction value of the average of I/O request processing standby times on the physical disks 1 to 4. The prediction value is more accurate because equation (4) can use more precise statistical information than that in equation (1).

In addition to the effects of the first embodiment, the sixth embodiment realizes logical disk relocation which meets a temporarily varying I/O request. This is because the sixth embodiment adopts pieces of statistical information in short periods obtained by dividing data in a relocation criteria period and the evaluation function Wt reflects a change in the number of I/O requests in each period.

[Seventh Embodiment]

The seventh embodiment of the present invention will be described in detail. The seventh embodiment changes the evaluation function described in the second embodiment to the following evaluation function Wt:

$$Wt = \frac{1}{d} \cdot \sum_{j=1}^{m} \sum_{i=1}^{n} \frac{\lambda_{ij}^2}{\mu_{ij}(\mu_{ij} - \lambda_{ij})} \left( \text{where} \sum_{j=1}^{m} \sum_{i=1}^{n} \lambda_{ji} = d \right) \quad (5)$$

where $\mu_{ij}$ is the I/O processing performance value of a physical disk i (=1, 2, ..., n) obtained from the unit number j (=1, 2, ..., m) of pieces of statistical information. Equation (5) is different from equation (2) used in the second embodiment in that a logical disk relocation determination unit 113' uses statistical information for calculation of the evaluation function Wt without summarizing the information. In the seventh embodiment, data of statistical information at small time intervals managed by a disk information management unit 103 are directly used to calculate the evaluation function Wt.

For example, when the disk information management unit 103 manages data at an interval of about 1 h and the logical disk relocation determination unit 113' uses these data, 24 pieces of statistical information at an interval of 1 h are extracted and used to calculate the evaluation function Wt without summarizing them.

The time interval by which the disk information management unit 103 manages data may be as short as about 10 min or as long as about 1 day. Alternatively, the disk information management unit 103 may manage data at a plurality of time intervals such as 10 min and 1 h. The logical disk relocation determination unit 113' extracts and uses an arbitrary number of pieces of statistical information. In other words, the logical disk relocation determination unit 113' generates a period as a relocation criteria by combining short periods by which pieces of statistical information are managed.

Similar to equation (2), equation (5) represents the prediction value of the average of I/O request processing standby times on physical disks 1 to 4. The prediction value is more accurate because equation (5) can use more precise statistical information than that in equation (2).

In addition to the effects of the second embodiment, the seventh embodiment realizes logical disk relocation which meets a temporarily varying I/O request. This is because the seventh embodiment adopts pieces of statistical information in short periods obtained by dividing data in a relocation criteria period and the evaluation function Wt reflects a change in the number of I/O requests in each period.

[Eighth Embodiment]

The eighth embodiment of the present invention will be described in detail. In the first, second, fifth, and sixth embodiments, each physical disk is assumed to be an M/M/1 queue model, and the average of I/O request processing standby times on physical disks upon logical disk relocation is directly calculated. To the contrary, the eighth embodiment directly calculates the average of I/O request processing response times on physical disks and employs a logical disk relocation plan having the smallest calculated value. The I/O request processing response time on each physical disk is equal to the reciprocal of the I/O processing performance value of the physical disk.

The eighth embodiment realizes relocation considering even the I/O request processing response time, in addition to the effects of the first, second, fifth, and sixth embodiments.

In the first to eighth embodiments, the storage system can be implemented by a computer. The computer may have a known arrangement which comprises a CPU (Central Processing Unit), a ROM (Read Only Memory), a RAM (Random Access Memory), a display, a keyboard, an external memory device, and a circuit which interfaces the physical disks 1 to 4.

The CPU executes processing in accordance with a program stored in the ROM or RAM or a command input from the keyboard. The CPU can write data in the external memory device and physical disks 1 to 4, and read out data from the external memory device and physical disks 1 to 4.

A data relocation program for realizing the data relocation method of the present invention in the computer is provided by being recorded on a recording medium such as a flexible disk, a CD-ROM (Compact Disk-ROM), a DVD-ROM (Digital Video Disk-ROM), or a memory card. This recording medium is inserted into an external memory device, and then the program written on the recording medium is read and transferred to the computer. The CPU writes the read program in a RAM or the like. Thereafter, the CPU executes the processes described in the first to eighth embodiments.

As has been described above, the present invention can avoid logical disk relocation based on an erroneous determination and execute more appropriate relocation to increase the I/O processing performance of the storage system (disk array apparatus). The present invention performs logical disk relocation in consideration of the I/O processing performance value of a physical disk, whereas the conventional method does not consider the I/O processing performance value of a physical disk. For this reason, the present invention can achieve more appropriate relocation.

Further, data can be easily relocated between different disk arrays or between different RAID types. Conventionally, the I/O processing performance value of a physical disk is different between different disk arrays or between different RAID types, and proper relocation is difficult to perform. However, the present invention relocates a logical disk in consideration of the I/O processing performance value of a physical disk, and can easily perform proper relocation.

The present invention does not adopt an assumption that each physical disk is an M/M/1 queue model. Even if a physical disk receives an I/O request whose occurrence rate is greatly different from the Poisson distribution, the present invention can avoid logical disk relocation which decreases the I/O processing performance.

The present invention can avoid logical disk relocation based on an erroneous determination, execute appropriate relocation, and increase the I/O processing performance of the storage system. The present invention can facilitate data relocation between different disk arrays or between different RAID types. Even when a physical disk receives an I/O request whose occurrence rate is greatly different from the Poisson distribution, the present invention can avoid logical disk relocation which decreases the I/O processing performance. Since the busy rate of a physical disk need not be measured or estimated, the present invention can be applied to even a situation in which the information amount is small.

When the average of processing standby times is calculated using the I/O processing performance values and I/O request arrival rates of physical disks, the present invention need not measure or estimate the busy rates of the physical disks and can be applied to even a situation in which the information amount is small.

An I/O processing performance value, I/O request arrival rate, and busy rate are obtained from statistical information measured every second time interval (e.g., 1 h or 1 day) shorter than the first time interval (e.g., 1 day or 1 week) during which the periodicity is observed in a data access pattern. Thus, logical disk relocation corresponding to a temporarily varying I/O request can be performed.

Moreover, the present invention can realize logical disk relocation considering even the I/O request processing response time.

What is claimed is:

1. A storage system comprising:
   a plurality of logical disks constituted by combining a plurality of physical disks;
   logical disk management means for converting input/output (I/O) requests addressed to said logical disks into I/O requests addressed to corresponding physical disks, and outputting the converted I/O requests;
   physical disk management means for accessing said corresponding physical disks in accordance with the I/O requests which are output from said logical disk management means and addressed to said physical disks; and
   logical disk relocation control means for relocating said logical disks so as to set busy rates of said physical disks within a range between a first state in which a ratio of the busy rates of said physical disks is equal to a ratio of I/O processing performance values of said physical disks, and a second state in which the busy rates of said physical disks are leveled.

2. A system according to claim 1, wherein said logical disk relocation control means obtains a busy rate of each physical disk in the first state as a first optimal busy rate when an average of busy rates of said physical disks is "0",
   obtains a busy rate of each physical disk in the second state as a second optimal busy rate when the average of the busy rates of said physical disks is "1",
   sets a value obtained by interpolating the first and second optimal busy rates as a third optimal busy rate used when the average of the busy rates of said physical disks is larger than "0" and smaller than "1", and
   relocates said logical disks so as to adjust the busy rate of each physical disk close to the third optimal busy rate.

3. A storage system comprising:
   a plurality of logical disks constituted by combining a plurality of physical disks;
   logical disk management means for converting input/output (I/O) requests addressed to said logical disks into I/O requests addressed to corresponding physical disks, and outputting the converted I/O requests;
   physical disk management means for accessing said corresponding physical disks in accordance with the I/O requests which are output from said logical disk management means and addressed to said physical disks; and
   logical disk relocation control means for relocating said logical disks so as to set a ratio of I/O request arrival rates of said physical disks equal to an Nth (N is a real number of not smaller than 1 and not larger than 2) power ratio of I/O processing performance values of said physical disks.

4. A system according to claim 3, wherein said logical disk relocation control means obtains an I/O request arrival rate of each physical disk for N=2 as a first optimal I/O request arrival rate when an average of busy rates of said physical disks is "0",
   obtains an I/O request arrival rate of each physical disk for N=1 as a second optimal I/O request arrival rate when the average of the busy rates of said physical disks is "1",
   sets a value obtained by interpolating the first and second optimal I/O request arrival rates as a third optimal I/O request arrival rate used when the average of the busy rates of said physical disks is larger than "0" and smaller than "1", and relocates said logical disks so as to adjust the I/O request arrival rate of said physical disk close to the third optimal I/O request arrival rate.

5. A storage system comprising:

a plurality of logical disks constituted by combining a plurality of physical disks;

logical disk management means for converting input/output (I/O) requests addressed to said logical disks into I/O requests addressed to corresponding physical disks, and outputting the converted I/O requests;

physical disk management means for accessing said corresponding physical disks in accordance with the I/O requests which are output from said logical disk management means and addressed to said physical disks; and logical disk relocation control means for calculating an average of processing standby times serving as a value obtained by averaging standby times of said physical disks until start of processing corresponding to I/O requests by using either one of a first group including I/O processing performance values, I/O request arrival rates, and busy rates of said physical disks, and a second group including the I/O processing performance values and the I/O request arrival rates of said physical disks, and for relocating said logical disks so as to minimize the average of the processing standby times.

6. A system according to claim 5, wherein said logical disk relocation control means obtains, as a first prediction value of a busy rate of a source physical disk, a value calculated by subtracting an occupied busy rate of a target logical disk from a busy rate of said source physical disk, obtains, as a second prediction value of a busy rate of a destination physical disk, a value calculated by adding the occupied busy rate of said target logical disk x (an I/O processing performance value of said source physical disk/an I/O processing performance value of said destination physical disk) to the busy rate of said destination physical disk, and letting n (n is an integer) be the number of physical disks, $\lambda_i$ be an I/O request arrival rate of a physical disk i (i is an integer of not smaller than 1 and not larger than n), and $\rho_i$ be a busy rate of said physical disk i, calculates an average Wt of the processing standby times using the first and second prediction values as for, of the busy rates $\rho_i$, the busy rates of said source physical disk and said destination physical disk:

$$Wt = \frac{1}{c} \cdot \sum_{i=1}^{n} \frac{\rho_i^2}{1 - \rho_i} \left( \text{where } \sum_{i=1}^{n} \lambda_i = c \right). \tag{1}$$

7. A system according to claim 5, wherein said logical disk relocation control means obtains, as a first prediction value of an I/O request arrival rate of a source physical disk, a value calculated by subtracting an occupied arrival rate of a target logical disk from an I/O request arrival rate of said source physical disk, obtains, as a second prediction value of an I/O request arrival rate of a destination physical disk, a value calculated by adding the occupied arrival rate of said target logical disk x (the I/O processing performance value of said source physical disk/the I/O processing performance value of said destination physical disk) to the I/O request arrival rate of said destination physical disk, and letting n (n is an integer) be the number of physical disks, $\mu_i$ be an I/O processing performance value of a physical disk i (i is an integer of not smaller than 1 and not larger than n), and $\lambda_i$ be an I/O request arrival rate of said physical disk i, calculates an average Wt of the processing standby times using the first and second prediction values as for, of the I/O request arrival rates $\lambda_i$, the I/O request arrival rates of said source physical disk and said destination physical disk:

$$Wt = \frac{1}{c} \cdot \sum_{i=1}^{n} \frac{\lambda_i^2}{\mu_i(\mu_i - \lambda_i)} \left( \text{where } \sum_{i=1}^{n} \lambda_i = c \right). \tag{2}$$

8. A system according to 5, wherein said logical disk relocation control means obtains an I/O request arrival rate and a busy rate from statistical information measured every second time interval shorter than a first time interval during which periodicity is observed in a data access pattern.

9. A system according to claim 8, wherein said logical disk relocation control means obtains, as a first prediction value of a busy rate of a source physical disk, a value calculated by subtracting an occupied busy rate of a target logical disk from a busy rate of said source physical disk, obtains, as a second prediction value of a busy rate of a destination physical disk, a value calculated by adding the occupied busy rate of said target logical disk x (an I/O processing performance value of said source physical disk/an I/O processing performance value of said destination physical disk) to the busy rate of said destination physical disk, and letting n (n is an integer) be the number of physical disks, m (m is an integer) be the unit number of pieces of statistical information acquired by said logical disk relocation determination means, $\lambda_{ij}$ be an I/O request arrival rate of a physical disk i (i is an integer of not smaller than 1 and not larger than n) obtained from the unit number j (j is an integer of not smaller than 1 and not larger than m) of pieces of statistical information, and $\rho_{ij}$ be a busy rate of said physical disk i, calculates an average Wt of the processing standby times using the first and second prediction values as for, of the busy rates $\rho_{ij}$, the busy rates of said source physical disk and said destination physical disk:

$$Wt = \frac{1}{d} \cdot \sum_{j=1}^{m} \sum_{i=1}^{n} \frac{\rho_{ij}^2}{1 - \rho_{ij}} \left( \text{where } \sum_{j=1}^{m} \sum_{i=1}^{n} \lambda_{ji} = d \right). \tag{4}$$

10. A system according to claim 8, wherein said logical disk relocation control means obtains, as a first prediction value of an I/O request arrival rate of a source physical disk, a value calculated by subtracting an occupied arrival rate of a target logical disk from an I/O request arrival rate of said source physical disk, obtains, as a second prediction value of an I/O request arrival rate of a destination physical disk, a value calculated by adding the occupied arrival rate of said target logical disk x (an I/O processing performance value of said source physical disk/an I/O processing performance value of said destination physical disk) to the I/O request arrival rate of said destination physical disk, and letting n (n is an integer) be the number of physical disks, m (m is an integer) be the unit number of pieces of statistical information acquired by said logical disk relocation determination means, $\mu_{ij}$ be an I/O processing performance value of a physical disk i (i is an integer of not smaller than 1 and not larger than n) obtained from the unit number j (j is an integer of not smaller than 1 and not larger than m) of pieces of statistical information, and $\lambda_{ij}$ be an I/O request arrival rate of the physical disk i, calculates an average Wt of the processing standby times using the first and second prediction values as for, of the I/O request arrival rates $\lambda_{ij}$, the I/O request arrival rates of said source physical disk and said destination physical disk:

$$W_t = \frac{1}{d} \cdot \sum_{j=1}^{m} \sum_{i=1}^{n} \frac{\lambda_{ij}^2}{\mu_{ij}(\mu_{ij} - \lambda_{ij})} \left( \text{where } \sum_{j=1}^{m} \sum_{i=1}^{n} \lambda_{ji} = d \right). \quad (5)$$

11. A storage system comprising:

a plurality of logical disks constituted by combining a plurality of physical disks;

logical disk management means for converting input/output (I/O) requests addressed to said logical disks into I/O requests addressed to corresponding physical disks, and outputting the converted I/O requests;

physical disk management means for accessing said corresponding physical disks in accordance with the I/O requests which are output from said logical disk management means and addressed to said physical disks; and logical disk relocation control means for calculating an average of response times serving as a value obtained by averaging time intervals of said physical disks between arrival of I/O request processing at said physical disks and end of the I/O request processing by using either one of a first group including I/O processing performance values, I/O request arrival rates, and busy rates of said physical disks, and a second group including the I/O processing performance values and the I/O request arrival rates of said physical disks, and for relocating said logical disks so as to minimize the average of the response times.

12. A system according to 11, wherein said logical disk relocation control means obtains an I/O request arrival rate and a busy rate from statistical information measured every second time interval shorter than a first time interval during which periodicity is observed in a data access pattern.

13. A data relocation method in a storage system which relocates a plurality of logical disks constituted by combining a plurality of physical disks, comprising the steps of:

assuming a first state in which a ratio of busy rates of the physical disks is equal to a ratio of input/output (I/O) processing performance values of the physical disks;

assuming a second state in which the busy rates of the physical disks are leveled; and relocating the logical disks so as to set the busy rates of the physical disks within a range between the first and second states.

14. A method according to claim 13, wherein the relocating step comprises the steps of:

obtaining a busy rate of each physical disk in the first state as a first optimal busy rate when an average of busy rates of the physical disks is "0";

obtaining a busy rate of each physical disk in the second state as a second optimal busy rate when the average of the busy rates of the physical disks is "1";

setting a value obtained by interpolating the first and second optimal busy rates as a third optimal busy rate used when the average of the busy rates of the physical disks is larger than "0" and smaller than "1"; and relocating the logical disks so as to adjust the busy rate of each physical disk close to the third optimal busy rate.

15. A data relocation method in a storage system which relocates a plurality of logical disks constituted by combining a plurality of physical disks, comprising the steps of:

obtaining a ratio of input/output (I/O) request arrival rates of the physical disks; and relocating the logical disks so as to set the obtained ratio of the I/O request arrival rates to an Nth (N is a real number of not smaller than 1 and not larger than 2) power ratio of I/O processing performance values of the physical disks.

16. A method according to claim 15, wherein the relocating step comprises the steps of:

obtaining an I/O request arrival rate of each physical disk for N=2 as a first optimal I/O request arrival rate when an average of busy rates of the physical disks is "0";

obtaining an I/O request arrival rate of each physical disk for N=1 as a second optimal I/O request arrival rate when the average of the busy rates of the physical disks is "1";

setting a value obtained by interpolating the first and second optimal I/O request arrival rates as a third optimal I/O request arrival rate used when the average of the busy rates of the physical disks is larger than "0" and smaller than "1"; and relocating the logical disks so as to adjust the I/O request arrival rate of the physical disk close to the third optimal I/O request arrival rate.

17. A data relocation method in a storage system which relocates a plurality of logical disks constituted by combining a plurality of physical disks, comprising the steps of:

calculating an average of processing standby times serving as a value obtained by averaging standby times of the physical disks until start of processing corresponding to I/O requests by using either one of a first group including I/O processing performance values, I/O request arrival rates, and busy rates of the physical disks, and a second group including the I/O processing performance values and the I/O request arrival rates of the physical disks; and relocating the logical disks so as to minimize the calculated average of the processing standby times.

18. A method according to claim 17, wherein the relocating step comprises the steps of:

obtaining, as a first prediction value of a busy rate of a source physical disk, a value calculated by subtracting an occupied busy rate of a target logical disk from a busy rate of the source physical disk;

obtaining, as a second prediction value of a busy rate of a destination physical disk, a value calculated by adding the occupied busy rate of the target logical disk x (an I/O processing performance value of the source physical disk/an I/O processing performance value of the destination physical disk) to the busy rate of the destination physical disk; and letting n (n is an integer) be the number of physical disks, $\lambda_i$ be an I/O request arrival rate of a physical disk i (i is an integer of not smaller than 1 and not larger than n), and $\rho_i$ be a busy rate of the physical disk i, calculating an average Wt of the processing standby times using the first and second prediction values as for, of the busy rates $\rho_i$, the busy rates of the source physical disk and the destination physical disk:

$$Wt = \frac{1}{c} \cdot \sum_{i=1}^{n} \frac{\rho_i^2}{1-\rho_i} \left( \text{where } \sum_{i=1}^{n} \lambda_i = c \right). \quad (1)$$

19. A method according to claim 17, wherein the relocating step comprises the steps of:
    obtaining, as a first prediction value of an I/O request arrival rate of a source physical disk, a value calculated by subtracting an occupied arrival rate of a target logical disk from an I/O request arrival rate of the source physical disk;
    obtaining, as a second prediction value of an I/O request arrival rate of a destination physical disk, a value calculated by adding the occupied arrival rate of the target logical disk x (the I/O processing performance value of the source physical disk/the I/O processing performance value of the destination physical disk) to the I/O request arrival rate of the destination physical disk; and
    letting n (n is an integer) be the number of physical disks, $\mu_i$ be an I/O processing performance value of a physical disk i (i is an integer of not smaller than 1 and not larger than n), and $\lambda_i$ be an I/O request arrival rate of the physical disk i, calculating an average Wt of the processing standby times using the first and second prediction values as for, of the I/O request arrival rates $\lambda_i$, the I/O request arrival rates of the source physical disk and the destination physical disk:

$$Wt = \frac{1}{c} \cdot \sum_{i=1}^{n} \frac{\lambda_i^2}{\mu_i(\mu_i - \lambda_i)} \left( \text{where } \sum_{i=1}^{n} \lambda_i = c \right). \quad (2)$$

20. A method according to 17, wherein the relocating step comprises the step of obtaining an I/O request arrival rate and a busy rate from statistical information measured every second time interval shorter than a first time interval during which periodicity is observed in a data access pattern.

21. A method according to claim 20, wherein the relocating step comprises the steps of:
    obtaining, as a first prediction value of a busy rate of a source physical disk, a value calculated by subtracting an occupied busy rate of a target logical disk from a busy rate of the source physical disk;
    obtaining, as a second prediction value of a busy rate of a destination physical disk, a value calculated by adding the occupied busy rate of the target logical disk x (an I/O processing performance value of the source physical disk/an I/O processing performance value of the destination physical disk) to the busy rate of the destination physical disk; and
    letting n (n is an integer) be the number of physical disks, m (m is an integer) be the unit number of pieces of acquired statistical information, $\lambda_{ij}$ be an I/O request arrival rate of a physical disk i (i is an integer of not smaller than 1 and not larger than n) obtained from the unit number j (j is an integer of not smaller than 1 and not larger than m) of pieces of statistical information, and $\rho_{ij}$ be a busy rate of the physical disk i, calculating an average Wt of the processing standby times using the first and second prediction values as for, of the busy rates $\rho_{ij}$, the busy rates of the source physical disk and the destination physical disk:

$$Wt = \frac{1}{d} \cdot \sum_{j=1}^{m} \sum_{i=1}^{n} \frac{\rho_{ij}^2}{1-\rho_{ij}} \left( \text{where } \sum_{j=1}^{m} \sum_{i=1}^{n} \lambda_{ji} = d \right). \quad (4)$$

22. A method according to claim 20, wherein the relocating step comprises the steps of:
    obtaining, as a first prediction value of an I/O request arrival rate of a source physical disk, a value calculated by subtracting an occupied arrival rate of a target logical disk from an I/O request arrival rate of the source physical disk;
    obtaining, as a second prediction value of an I/O request arrival rate of a destination physical disk, a value calculated by adding the occupied arrival rate of the target logical disk x (an I/O processing performance value of the source physical disk/an I/O processing performance value of the destination physical disk) to the I/O request arrival rate of the destination physical disk; and
    letting n (n is an integer) be the number of physical disks, m (m is an integer) be the unit number of pieces of acquired statistical information, $\mu_{ij}$ be an I/O processing performance value of a physical disk i (i is an integer of not smaller than 1 and not larger than n) obtained from the unit number j (j is an integer of not smaller than 1 and not larger than m) of pieces of statistical information, and $\lambda_{ij}$ be an I/O request arrival rate of the physical disk i, calculating an average Wt of the processing standby times using the first and second prediction values as for, of the I/O request arrival rates $\lambda_{ij}$, the I/O request arrival rates of the source physical disk and the destination physical disk:

$$Wt = \frac{1}{d} \cdot \sum_{j=1}^{m} \sum_{i=1}^{n} \frac{\lambda_{ij}^2}{\mu_{ij}(\mu_{ij}-\lambda_{ij})} \left( \text{where } \sum_{j=1}^{m} \sum_{i=1}^{n} \lambda_{ji} = d \right). \quad (5)$$

23. A data relocation method in a storage system which relocates a plurality of logical disks constituted by combining a plurality of physical disks, comprising the steps of:
    calculating an average of response times serving as a value obtained by averaging time intervals of the physical disks between arrival of I/O request processing at the physical disks and end of the I/O request processing by using either one of a first group including I/O processing performance values, I/O request arrival rates, and busy rates of the physical disks, and a second group including the I/O processing performance values and the I/O request arrival rates of the physical disks; and
    relocating the logical disks so as to minimize the calculated average of the response times.

24. A method according to 23, wherein the relocating step comprises the step of obtaining an I/O request arrival rate and a busy rate from statistical information measured every second time interval shorter than a first time interval during which periodicity is observed in a data access pattern.

25. A computer-readable recording medium which records a data relocation program in a storage system which relocates a plurality of logical disks constituted by combining a plurality of physical disks, wherein the data relocation program comprises programs which execute procedures of:

assuming a first state in which a ratio of busy rates of the physical disks is equal to a ratio of input/output (I/O) processing performance values of the physical disks;

assuming a second state in which the busy rates of the physical disks are leveled; and relocating the logical disks so as to set the busy rates of the physical disks within a range between the first and second states.

26. A computer-readable recording medium which records a data relocation program in a storage system which relocates a plurality of logical disks constituted by combining a plurality of physical disks, wherein the data relocation program comprises programs which execute procedures of:

obtaining a ratio of input/output (I/O) request arrival rates of the physical disks; and relocating the logical disks so as to set the obtained ratio of the I/O request arrival rates to an Nth (N is a real number of not smaller than 1 and not larger than 2) power ratio of I/O processing performance values of the physical disks.

27. A computer-readable recording medium which records a data relocation program in a storage system which relocates a plurality of logical disks constituted by combining a plurality of physical disks, wherein the data relocation program comprises programs which execute procedures of:

calculating an average of processing standby times serving as a value obtained by averaging standby times of the physical disks until start of processing corresponding to I/O requests by using either one of a first group including I/O processing performance values, I/O request arrival rates, and busy rates of the physical disks, and a second group including the I/O processing performance values and the I/O request arrival rates of the physical disks; and relocating the logical disks so as to minimize the calculated average of the processing standby times.

28. A computer-readable recording medium which records a data relocation program in a storage system which relocates a plurality of logical disks constituted by combining a plurality of physical disks, wherein the data relocation program comprises programs which execute procedures of:

calculating an average of response times serving as a value obtained by averaging time intervals of the physical disks between arrival of I/O request processing at the physical disks and end of the I/O request processing by using either one of a first group including I/O processing performance values, I/O request arrival rates, and busy rates of the physical disks, and a second group including the I/O processing performance values and the I/O request arrival rates of the physical disks; and relocating the logical disks so as to minimize the calculated average of the response times.

* * * * *